United States Patent [19]

Takeuchi

[11] 3,910,647

[45] Oct. 7, 1975

[54] SKID CONTROL SYSTEM

[75] Inventor: Yasuhisa Takeuchi, Yokosuka, Japan

[73] Assignee: Nissan Motor Company Limited, Yokohama, Japan

[22] Filed: Dec. 6, 1973

[21] Appl. No.: 422,154

[30] Foreign Application Priority Data
Dec. 7, 1972 Japan.............................. 47-121992

[52] U.S. Cl................. 303/21 A; 180/82 R; 303/20
[51] Int. Cl.² ........................................... B60T 8/02
[58] Field of Search...... 180/79.1, 82 R; 188/181 C; 235/150.2; 303/20, 21; 307/10 R; 317/5; 324/161; 340/53, 62, 263; 343/8, 9

[56] References Cited
UNITED STATES PATENTS

| | | |
|---|---|---|
| 3,288,232 | 11/1966 | Shepherd.................... 303/21 EB X |
| 3,394,967 | 7/1968 | Lucien........................... 303/21 BE |
| 3,701,568 | 10/1972 | Lewis et al....................... 303/21 P |
| 3,735,200 | 5/1973 | Kritz........................... 303/21 BE X |
| 3,797,892 | 3/1974 | Leiber.............................. 303/21 EB |

Primary Examiner—Trygve M. Blix
Assistant Examiner—Stephen G. Kunin

[57] ABSTRACT

Three doppler radar sensors acting in conjunction with computing apparatus produce signals related to the forward and lateral velocities of the vehicle with respect to the road surface, and to the lateral velocity of the vehicle rear end. Hydraulic pressure in the vehicle front brake cylinders is reduced to prevent skidding of the vehicle if the brake pedal is depressed, and the product of the forward velocity of the vehicle and the angular displacement of the steering wheel minus the lateral velocity of the vehicle is greater than the forward velocity. Similarly, hydraulic pressure in the rear brake cylinders is reduced if the brake pedal is depressed, and the lateral velocity of the vehicle rear end is greater than the forward velocity.

2 Claims, 3 Drawing Figures

SKID CONTROL SYSTEM

The present invention relates in general to a skid control system for a wheeled vehicle and more particularly to a skid control system to eliminate skidding of a vehicle due to locked wheels, especialy under slippery driving conditions where the coefficient of friction between the wheels and the road surface is small.

It is well known in the art that vehicle steering stability is generally improved as the cornering force imposed on the wheels rises. The cornering force is in turn inversely proportional to the slippage between the wheels and the road surface during braking. Maximum braking force occurs within a range of slippage of approximately 15 to 25 per cent.

In order to prevent the vehicle from skidding during braking to obtain maximum vehicle steering stability, typical known skid control systems sense the wheel deceleration mechanically or electrically and reduce the braking force on the wheels if the wheel deceleration is great to prevent locking of the wheels whether or not the driver intentionally releases the brake pedal. This prevents skidding of the vehicle due to locked wheels, loss of steering control and spinning of the vehicle. Prior art skid control systems usually estimate the slippage between the wheels and the road surface during braking using a computing means which is responsive to the wheel deceleration, and controls a hydraulic pressure modulator to modulate the pressure of fluid applied to hydraulic brakes to keep the estimated slippage between approximately 15 to 25 per cent.

However, with a prior art skid control system as described above, if the slippage between the wheels and the road surface is incorrectly estimated during emergency braking, the wheels will lock, resulting in skidding of the vehicle and loss of steering control which is very dangerous. As a result, the total braking distance and time are considerably extended, and the merit of installation of the skid control system is lost entirely. Moreover, prior art skid control systems have another drawback in that the wheel deceleration sensors are not reliable in operation because they must operate under severe conditions such as vibration or shock due to locked wheels, a muddy road, or variations in temperature.

Thus, prior art skid control systems are inadequate and a serious problem remains to be solved, so that there is a pressing need for an improved skid control system. The present invention contemplates resolution of the drawbacks mentioned above which have thus far been inherent in prior art skid control systems.

It is accordingly a primary object of the present invention to provide an improved skid control system for use in an automotive wheeled vehicle.

It is another object of the present invention to provide an improved skid control system which is capable of preventing skidding of the vehicle, particularly sideslipping of the vehicle during braking, without impairing vehicle steering stability.

It is still another object of the present invention to provide an improved skid control system which utilizes a doppler radar system rather than a wheel deceleration sensor to determine the relative velocity between the vehicle and the road surface.

It is yet another object of the present invention to provide an improved skid control system which is highly reliable in operation.

It is a further object of the present invention to provide an improved skid control system which is capable of stopping a vehicle in a short time and distance during an emergency braking operation.

It is still a further object of the present invention to provide an improved skid control system which is simple in construction and can easily be incorporated into an automotive wheeled vehicle.

These and other objects and advantages of a skid control system according to the present invention will become more apparent from the following description taken in conjunction with the accompanying drawings in which like reference numerals and characters designate similar parts and elements throughout the figures and in which.

Figure 1:
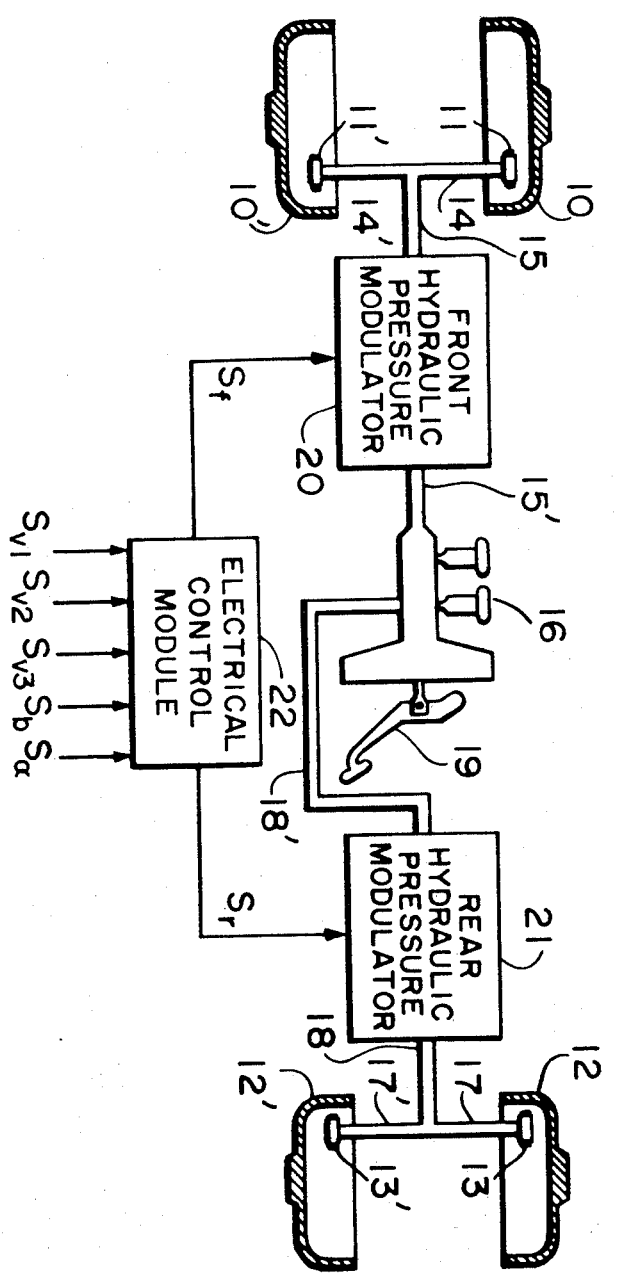
FIG. 1 is a schematic diagram of a preferred embodiment of a skid control system according to the present invention.

Referring now to the drawings and more particularly to FIG. 1 thereof, an automotive wheeled vehicle has front wheels (not shown) equipped with brake drums 10 and 10' and front brake cylinders 11 and 11', and rear wheels (not shown) with brake drums 12 and 12' and rear brake cylinders 13 and 13'. Hydraulic lines 14 and 14' connect the cylinders 11 and 11' respectively with a common fluid line 15 which is pressurized by a master cylinder 16 via a line 15'. On the other hand, hydraulic lines 17 and 17' connect the cylinders 13 and 13' respectively with another common fluid line 18 which is pressurized by the master cylinder 16 via a line 18'. The master cylinder 16 may be of any conventional construction and be manually actuable by a brake pedal 19. The pressure of fluid from the master cylinder 16 can be modulated by a front hydraulic pressure modulator 20 which is connected between the fluid lines 15 and 15', to control the fluid pressure in the front brake cylinders 11 and 11' and hence the operation of the brakes. The brakes associated with the brake drums 10 and 10' can be of any conventional construction, and the details thereof are omitted for purposes of simplicity. Similarly, the pressure of fluid from the master cylinder 16 can be modulated by a rear hydraulic pressure modulator 21 which is connected between the fluid lines 18 and 18' to control the fluid pressure in the rear brake cylinders 13 and 13', and the operation of the brakes associated with the brake drums 12 and 12'. The front and rear hydraulic pressure modulators 20 and 21 may be of any type known in the art.

The front and rear hydraulic pressure modulators 20 and 21 are actuated in accordance with electrical signals S from an electrical control module 22. The electrical control module 22 receives an electrical brake signal Sb from a braking demand sensor 26 connected to the master cylinder 16 and first, second and third electrical signals $S_{r1}$, $S_{r2}$ and $S_{r3}$ from a doppler radar system which will be described hereinafter in more detail. The module 22 actuates the front and rear hydraulic pressure modulators 20 and 21 to control the fluid pressure in the brake cylinders 11 and 11' and 13 and 13' respectively independent of the pressure in the master cylinder 16.

Figure 2:
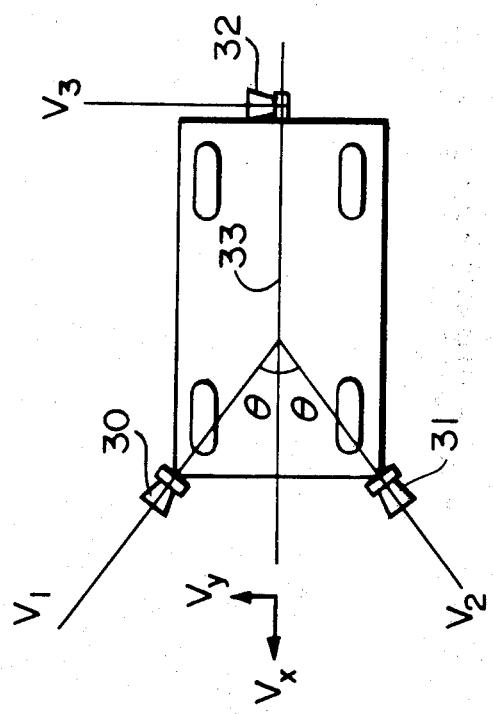
FIG. 2 is a schematic diagram illustrating the arrangement of doppler radars of the skid control system of FIG. 1 installed in a vehicle.

FIG. 2 shows the doppler radar system, which comprises first and second doppler radar sensors 30 and 31 which are mounted on a vehicle front portion, and a third doppler radar sensor 32 which is mounted on a vehicle rear portion. As shown, the doppler radar sensor 30 is aimed in a first angular direction at an angle $\theta$ to a longitudinal axis 33 of the vehicle, while the doppler radar sensor 31 is aimed in a second angular direction symmetric with the first angular direction. It will be appreciated by those skilled in the art that the doppler radar sensors 30 and 31 may be aimed inward toward the longitudinal axis 33, if desired. The doppler radar sensor 32 is aimed perpendicular to the longitudinal axis 33.

The doppler radar sensors 30, 31 and 32 are responsive to reflected signals from objects in the vehicle path, and measure relative velocities V1 and V2 between the vehicle and the road surface in their directions of radiation and produce the electrical signals $S_{v1}$, and $S_{v2}$ and $S_{v3}$ analogous thereto.

$Vx$ and $Vy$ are the forward and lateral relative velocities between the vehicle and the road surface respectively, and the above-mentioned velocities V1 and V2 are given by $$V1 = Vx \cos \theta + Vy \sin \theta \quad (1)$$
$$V2 = Vx \cos \theta - Vy \sin \theta \quad (2)$$

This means that the forward and lateral velocities $Vx$ and $Vy$ may be obtained from the relative velocities $V1$ and $V2$ which are derived from the doppler radar sensors 30 and 31. Thus, the forward and lateral velocities $Vx$ and $Vy$ are given as follows:

$$Vx = \frac{V1 + V2}{2 \cos \theta} \quad (3)$$

$$Vy = \frac{V1 - V2}{2 \sin \theta} \quad (4)$$

Therefore, it will be appreciated that the forward and lateral velocities $Vx$ and $Vy$ can be computed by an appropriate computing device comprising function generators which are able to electrically solve the above equations (3) and (4) in response to the electrical signals $S_{v1}$ and $S_{v2}$ from the doppler radar sensors 30 and 31.

Figure 3:
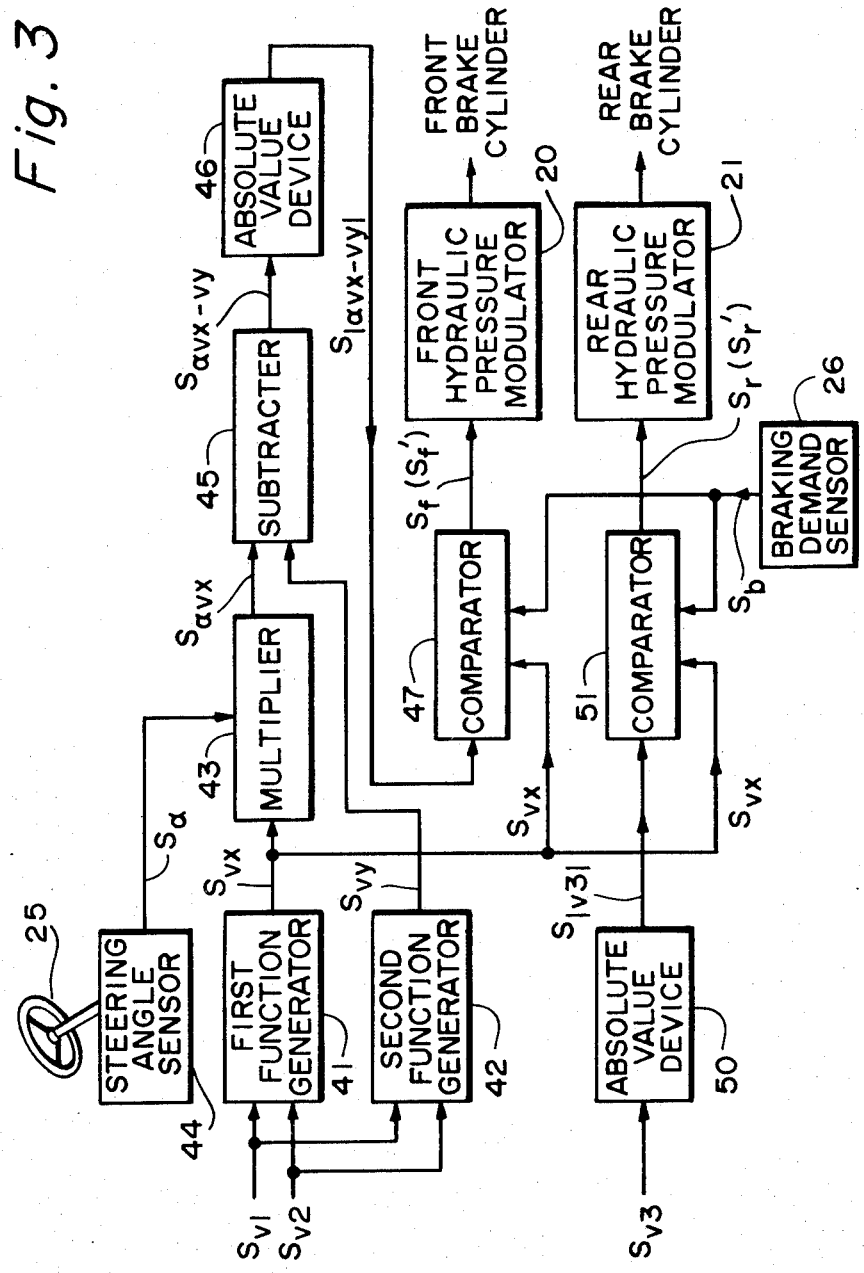
FIG. 3 is a block diagram of an electrical control module and other parts of the skid control system shown in FIG. 1.

FIG. 3 shows the circuitry of the electrical control module 22 in which a first bivariant function generator 41 is responsive to the electrical signals $S_{v1}$ and $S_{v2}$ from the doppler radars 30 and 31 respectively to calculate the forward velocity $Vx$ and produce an electrical forward signal $S_{vx}$ and analogous thereto, and a second bivariant function generator 42 is responsive to the electrical signals $S_{v1}$ and $S_{v2}$ from the doppler radar sensors 30 and 31 to calculate the lateral velocity $Vy$ and produce an electrical lateral signal $S_{vy}$ analogous thereto. The forward signal $S_{vx}$ is fed to a multiplier 43 which also receives an electrical steering angle signal $S_\alpha$ from a steering angle sensor 44. The steering angle $S_\alpha$ is analogous to the angular displacement of a manual steering control member such as a steering wheel 25 from a central position. The multiplier 43 multiplies the forward signal $S_{vx}$ by the steering angle signal $S_\alpha$ and produces a fourth electrical signal $S_{\alpha vx}$ analogous to the product thereof. The fourth signal $S_{\alpha vx}$ is fed into a subtractor 45 which also receives the lateral signal $S_{vy}$ from the generator 42. The subtractor 45 calculates the difference between the fourth signal $S_{\alpha vx}$ and the lateral signal $X_{vy}$ and produces a fifth electrical signal $S_{\alpha vx - vy}$ analogous thereto which is fed into an absolute value device 46. The absolute value device 46 then produces an electrical output signal $S_{|\alpha vx - vy|}$ equal to the magnitude of the fifth signal $S_{\alpha vx - vy}$ but always of one polarity. It will be easily understood that the higher the output voltage of the absolute value device 46, the greater the difference between the steering direction and the actual forward direction of the vehicle. The signal $S_{|\alpha vx - vy|}$ is fed into a comparator 47 which also receives the forward signal $S_{vx}$ and the braking signal $Sb$.

If the magnitude of the signal $S_{|\alpha vx - vy|}$ is greater than flat of the forward signal $S_{vx}$, the comparator 47 produces a sixth signal $Sf$ which is fed to the front hydraulic pressure modulator 20 to reduce the pressure of fluid in the front brake cylinders 11 and 11' to reduce the braking force applied thereby to the front wheels, thus preventing the front wheels from locking and causing the vehicle to skid. On the other hand, if the magnitude of the signal $S_{|\alpha vx - vy|}$ is lower than that of the forward signal $S_{vx}$, the comparator 47 produces a signal $Sf'$ which is fed to the front hydraulic pressure modulator 20 to provide direct connection of the master cylinder 16 to the brake cylinders 11 and 11' to provide full front wheel braking force. Thus, the vehicle is prevented from skidding or sideslipping during braking without impairing vehicle steering stability.

The third signal $S_{v3}$ from the third doppler radar sensor 32 is fed into another absolute value device 50 which produces an electrical signal $S_{|v3|}$ equal to the magnitude of the third signal $S_{v3}$ but always of one polarity. The signal $S_{|v3|}$ is fed into a second comparator 51 which also receives the forward signal $S_{vx}$ from the generator 41 and the braking signal $Sb$. If the braking signal $Sb$ is present and the magnitude of the third signal $S_{|v3|}$ is greater than that of the forward signal $S_{vx}$, the comparator 51 produces a seventh signal $Sr$ which is fed to the rear hydraulic pressure modulator 21, and the modulator 21 reduces the fluid pressure in the rear brake cylinders 12 and 12' to reduce the braking force applied to the rear wheels, thus preventing the rear wheels from locking and causing the vehicle to skid. On the other hand, if the magnitude of the third signal $S_{|v3|}$ is lower than that of the forward signal $S_{vx}$, the comparator 51 produces a signal $Sr'$ which is fed to the rear hydraulic pressure modulator 21 to apply full braking force to the rear wheels.

What is claimed is:

1. A skid control system to modulate the pressure of fluid fed into front and rear hydraulic brake cylinders of a vehicle from a manually actuable hydraulic master cylinder; comprising:

a first doppler radar sensor which produces a first signal related to the relative velocity of the vehicle with respect to the road surface in a first angular direction relative to the longitudinal axis of the vehicle;

a second doppler radar sensor which produces a second signal related to the relative velocity of the vehicle with respect to the road surface in a second angular direction which is symmetrical with said first angular direction relative to the longitudinal axis of the vehicle;

a third doppler radar sensor which produces a third signal related to the lateral velocity of a rear portion of the vehicle;

a steering angle sensor to produce a steering angle signal related to the angular displacement of a manual vehicle steering control member from a central position;

a braking demand sensor to produce a braking signal when the master cylinder is manually actuated;

computing means to respectively produce forward and lateral signals related to the forward and lateral velocities of the vehicle with respect to the road surface in response to said first and second signals;

a multiplier to produce a fourth signal related to the product of said forward signal and said steering angle signal;

a subtracter to produce a fifth signal related to the difference between said fourth signal and said lateral signal;

a first comparator to produce a sixth signal to produce the pressure of fluid in the front brake cylinder to prevent skidding of the vehicle if the magnitude of said fifth signal is greater than the magnitude of said forward signal and said braking signal is being generated by said braking demand sensor; and a second comparator to produce a seventh signal to reduce the pressure of fluid in the rear brake cylinder to prevent skidding of the vehicle if the magnitude of said third signal is greater than the magnitude of said forward signal and said braking signal is being generated by said braking demend sensor.

2. A skid control system as claimed in claim 1, in which said computing means includes a first function generator to produce said forward signal; the magnitude of said forward signal being equal to the sum of said first and second signals divided by the angle between said first and second angular directions; and a second function generator to produce said lateral signal; the magnitude of said lateral signal being equal to the difference between said first and second signals divided by the angle between said first and second angular directions.

* * * * *